UNITED STATES PATENT OFFICE.

FRITZ HOFMANN AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING BETA-GAMMA-DIMETHYLERYTHRENE.

1,002,399.  Specification of Letters Patent.  Patented Sept. 5, 1911.

No Drawing.  Application filed December 27, 1910. Serial No. 599,383.

*To all whom it may concern:*

Be it known that we, FRITZ HOFMANN and KURT MEISENBURG, doctors of philosophy, chemists, citizens of the German Empire, residing at Elberfeld, Germany, have invented new and useful Improvements in Processes for Producing Beta-Gamma-Dimethylerythrene, of which the following is a specification.

The process hitherto known for the production of beta-gamma-dimethylerythrene is to treat pinacone with dilute sulfuric acid, acetic anhydrid, tartaric acid or phosphoric acid. The chief product of the reaction however is pinacolin and beta-gamma-dimethylerythrene is only formed in traces.

We have discovered a new process which results in an excellent yield of beta-gamma-dimethylerythrene and which consists in distilling pinacone with an acid salt of a sulfonic acid.

The process proceeds according to the following equation:

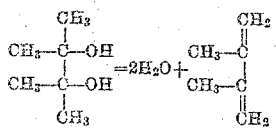

In order to illustrate the new process more fully the following example is given, the parts being by weight:—100 parts of pinacone are mixed with 150 parts of the monopotassium salt of 1.5-naphthalene-disulfonic acid and the resulting mixture is heated to 120–130° C. Dimethylerythrene and water distil over besides pinacone hydrate and small quantities of pinacolin. The distillate consists of two layers. The upper layer is separated, dried over calcium chlorid and submitted to fractional distillation. The fraction boiling from 67–97° C. is for further purification distilled once more over metallic sodium. The beta-gamma-dimethylerythrene boils at 68–69° C. The quantities of the potassium salt may be varied and other salts of sulfonic acids may be used, e. g., the acid potassium salt of 1.5-aminonaphthol-3.7-disulfonic acid.

We claim:—

1. Process for producing beta-gamma-dimethylerythrene, which process consists in first distilling pinacone with an acid salt of a sulfonic acid and then separating the beta-gamma-dimethylerythrene, substantially as described.

2. Process for producing beta-gamma-dimethylerythrene, which process consists in first distilling pinacone with the acid potassium salt of 1.5-naphthalene-disulfonic acid and then separating the beta-gamma-dimethylerythrene, substantially as described.

In testimony whereof we have hereunto set our hands in the presence of two subscribing witnesses.

FRITZ HOFMANN. [L. S.]
KURT MEISENBURG. [L. S.]

Witnesses:
CHAS. J. WRIGHT,
WALTER VONNEGUT.